United States Patent [19]

Gill et al.

[11] Patent Number: 5,060,467
[45] Date of Patent: Oct. 29, 1991

[54] CABLE CORE WITH A TWISTING CHANNEL, AND LAYING OPTICAL FIBER THEREIN

[75] Inventors: Ronald Y. Gill, Chelmsford; Frank J. Shepherd, Romford, both of Great Britain

[73] Assignee: Telephone Cables Limited, England

[21] Appl. No.: 400,829

[22] Filed: Aug. 29, 1989

[30] Foreign Application Priority Data

Sep. 7, 1988 [GB] United Kingdom ............... 8820941
May 19, 1989 [GB] United Kingdom ............... 8911533

[51] Int. Cl.$^5$ ..................... D01H 13/04; D01H 13/32
[52] U.S. Cl. ........................................ 57/13; 57/264; 57/352
[58] Field of Search ............... 57/264, 293, 3, 7, 9, 57/13, 352, 361

[56] References Cited

U.S. PATENT DOCUMENTS

| | | | |
|---|---|---|---|
| 4,154,049 | 5/1979 | King et al. | 57/9 |
| 4,411,130 | 10/1983 | Dubois et al. | 57/264 X |
| 4,497,164 | 2/1985 | Dotti et al. | 57/9 X |
| 4,587,801 | 5/1986 | Missout et al. | 57/264 X |
| 4,663,926 | 5/1987 | Girardon et al. | 57/9 X |
| 4,706,449 | 11/1987 | Akre | 57/9 X |
| 4,796,414 | 1/1989 | Bruggmann et al. | 57/9 X |
| 4,825,629 | 5/1989 | Missout et al. | 57/13 X |
| 4,833,871 | 5/1989 | Ogawa et al. | 57/9 X |
| 4,856,266 | 8/1989 | Ogawa et al. | 57/3 X |

FOREIGN PATENT DOCUMENTS

| | | |
|---|---|---|
| 0020189 | 12/1980 | European Pat. Off. |
| 0061124 | 9/1982 | European Pat. Off. |
| 3508959 | 3/1986 | Fed. Rep. of Germany |
| 2022644 | 12/1979 | United Kingdom |
| 1601303 | 10/1981 | United Kingdom |
| 2121209 | 12/1983 | United Kingdom |

*Primary Examiner*—Joseph J. Hail, III
*Attorney, Agent, or Firm*—Kirschstein, Ottinger, Israel & Schiffmiller

[57] ABSTRACT

Apparatus for laying an optical fiber unit into one of a plurality of parallel helical or reversing helical grooves in the outer surface of a cable core conveys the core along a path. A downstream guide is freely rotatable about the core path and has an aperture for feeding the fiber unit into the groove and an inward projection for following one of the grooves to maintain registration of the downstream guide with the groove. An upstream guide is indpendently rotatable about the core path and adjacent the downstream guide, and guides the fiber from a fiber supply toward the downstream guide. A servo drive is responsive to the rotation of the downstream guide relative to the upstream guide to drive the upstream guide such as to reduce that relative angle.

7 Claims, 2 Drawing Sheets

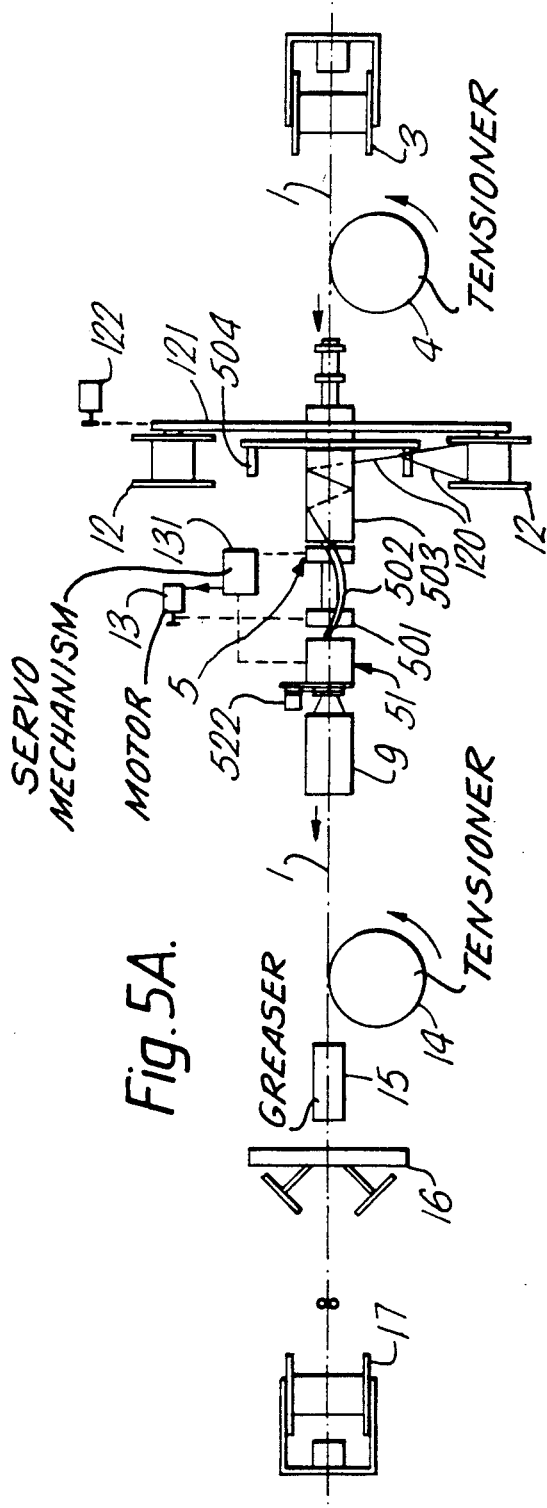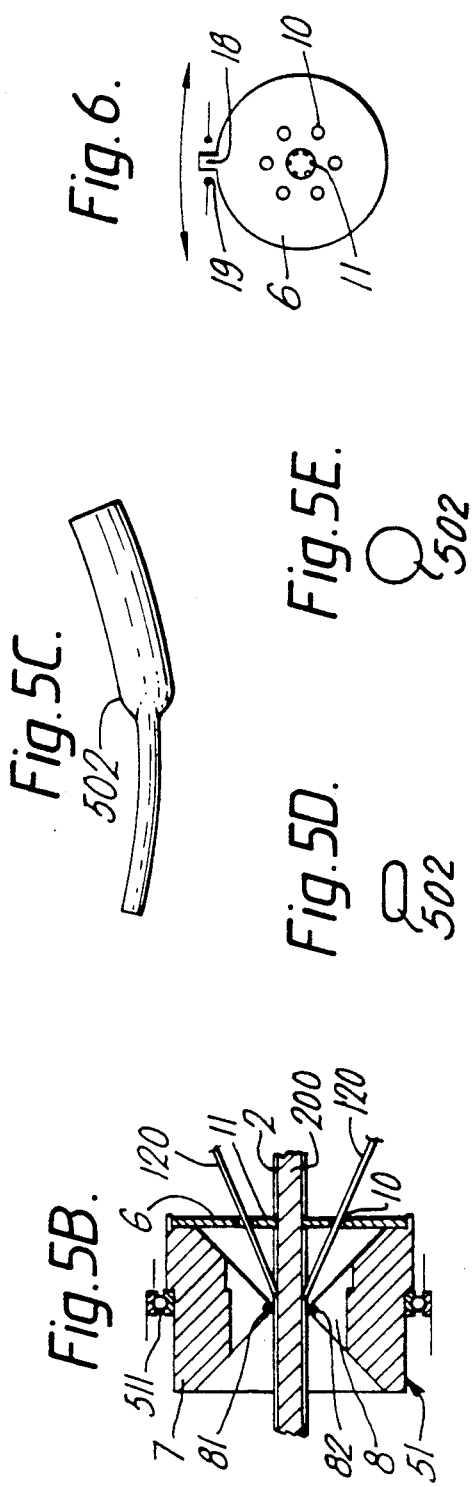

CABLE CORE WITH A TWISTING CHANNEL, AND LAYING OPTICAL FIBER THEREIN

BACKGROUND OF THE INVENTION

1. Field of the Invention

This specification discloses two related inventions: a first relating to cable core, and to apparatus and a method for its manufacture, and a second relating to the laying of optical fibre into grooves in such cable core.

2. Description of Related Art

The first invention relates to a cable core formed with a longitudinal channel for receiving a filament such as an optical fibre or fibre ribbons, to apparatus for extruding such a cable core and to a method of manufacturing such a cable core. The invention is particularly useful in the manufacture of optical cable incorporating an extruded core of thermoplastics material having a set of parallel longitudinally-extending channels, at least one of which accommodates one or more optical fibres, the core being surrounded by an outer sheath.

Optical fibre cable of this type must be capable of tolerating axial strain without transmitting tension to the optical fibres, and this has generally been achieved by causing the channels to twist in a continuous or periodically reversing helix about the core axis. The optical fibres are loosely accommodated within the respective channel or channels, which may either be completely closed or be formed as grooves in the periphery of the core.

Optical cable of this type must also tolerate being bent around a drum, again without tensioning or compressing unduly the optical fibres, and periodic reversal of the helical twist of the channels is capable of giving the optical cable such a tolerance.

In order to provide sufficient overfeed of the optical fibres in their respective channels to give the optical cable a sufficient tolerance of axial strain, for example 0.3%, the channels are required to twist with a much shorter pitch than is required simply to give the optical cable the necessary tolerance to bending around a drum. The wide amplitude and relatively short pitch twisting of the channels makes the subsequent process of feeding optical fibres or ribbons into the channels especially difficult, since the channels have to be followed by the feeding mechanism.

SUMMARY OF THE INVENTION

Accordingly, in one aspect the invention provides a cable core formed with at least one continuous longitudinal channel for receiving a filament (for example an electric wire or an optical fibre), the twist angle of the channel oscillating, as a function of longitudinal position, with relatively short-pitch, small amplitude variations superimposed on a relatively long-pitch variation.

According to a second aspect, the invention provides apparatus for extruding cable core of this type, comprising an extrusion die having at least one channel-forming element, and means for causing relative oscillatory motion of the channel-forming element and an inner region of the core as the core is extruded so as to form a continuous longitudinal channel whose twist angle oscillates, as a function of longitudinal position, with relatively short-pitch, small amplitude variations superimposed on a relatively long-pitch variation.

The invention, in a further aspect, consists in a method of manufacturing cable core of this type using a channel-forming element, comprising causing superimposed relative continuous axial movement and relative oscillatory twisting movement between the element and an inner region of the core, the oscillatory twisting movement comprising relatively short-pitch, small amplitude variations superimposed on a relatively long-pitch variation.

The long-pitch variation gives the resulting cable a tolerance of bending strain, while the short-pitch variations give it a tolerance of axial strain.

The or each channel is preferably a groove formed in the surface of the core, and the relatively long-pitch variation is preferably a relatively large-amplitude oscillatory variation, to generate a reversing helical pattern.

The second invention relates to apparatus and to a method for laying an optical fibre unit into one of a plurality of parallel helical or reversing helical grooves in the outer surface of a cable core, and to an optical cable core assembly thus produced.

Apparatus of this type is disclosed in U.K. Patent Nos. 1601303 and 2022644, but neither form of apparatus is especially suitable to the insertion of optical fibre unit in cable core having grooves of the reversing helical type but in which the twist angle of each groove oscillates as a function of longitudinal position with relatively short-pitch, small amplitude variations superimposed on a relatively long-pitch variation, i.e. in accordance with the first invention. Neither is the apparatus satisfactory for feeding optical fibre units in the form of ribbons.

One purpose of the invention is to provide apparatus which is capable of accommodating both the short-pitch and the long-pitch variations of groove position without constricting the free movement of the or each optical fibre unit from the supply into the groove.

Accordingly, the invention provides, in a first aspect, apparatus for laying an optical fibre unit into one of a plurality of parallel helical or reversing helical grooves in the outer surface of a cable core, comprising: means for conveying the core along a path; a downstream guide freely rotatable about the core path and having an aperture for feeding the fibre unit into the groove and an inward projection for following one of the grooves to maintain registration of the downstream guide with the groove; an upstream guide independently rotatable about the core path and adjacent and upstream of the downstream guide, having means for guiding the fibre unit from a fibre unit supply towards the downstream guide; and servo drive means responsive to the rotation of the downstream guide relative to the upstream guide to drive the upstream guide such as to reduce that relative angle. The fibre unit is preferably an optical fibre ribbon.

According to a second aspect, the invention provides a method of laying an optical fibre unit into one of a plurality of parallel, reversing helical grooves in the outer surface of a cable core, each groove having a twist angle which oscillates as a function of longitudinal position with relatively short-pitch, small amplitude variations superimposed on a relatively long-pitch variation, comprising: conveying the core along a path through upstream and downstream fibre guides; feeding the fibre unit from a supply first through the upstream guide and then through the downstream guide and into the groove, the downstream guide having means for following the angular position of the groove to maintain its registration with the groove independently of the upstream guide; and sensing the relative angular positions of the upstream and downstream guides to rotate the upstream guide so as to follow the downstream guide.

According to a third aspect, the invention provides an optical cable core assembly comprising a plurality of optical fibre ribbons contained loosely in at least one helical or reversing helical groove in the surface of a cable core, one or more ribbon to each groove, the length of each ribbon exceeding the length along the groove to provide axial tensile strain relief, wherein each ribbon is orientated substantially radially of the core.

A core assembly embodying the invention has the advantage of combining a high fibre density with substantial axial tensile strain relief for the fibres, because of their freedom to undulate across the groove.

BRIEF DESCRIPTION OF THE DRAWINGS

One way in which each invention may be performed will now be described, by way of example only, with reference to the accompanying diagrammatic drawings, in which:

FIG. 5A is a diagram of apparatus for laying four loosely stacked optical fibre ribbons into each of six parallel reversing helical grooves in the cable core of FIG. 2;

FIG. 5B is a longitudinal section through part of the apparatus of FIG. 5A for feeding the optical fibre ribbons into the grooves;

FIG. 5C is an elevation, to an enlarged scale, of a ribbon-guiding tube of the apparatus of FIG. 5A, of which tube FIGS. 5D and 5E are different end views; and FIG. 6 is a view taken along the core feed path of part of the apparatus of FIG. 5B.

DETAILED DESCRIPTION OF THE PREFERRED EMBODIMENTS

Figure 1:
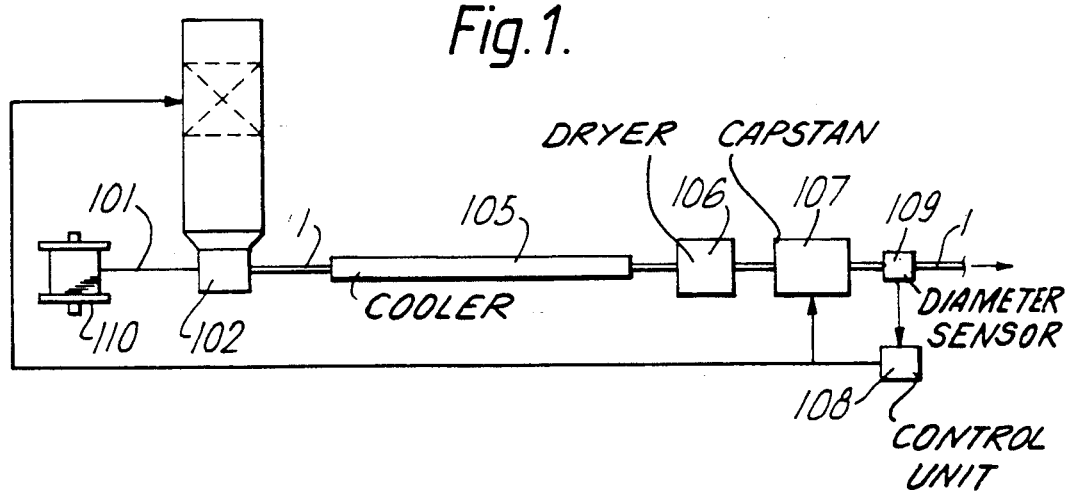
FIG. 1 represents apparatus for manufacturing optical cable comprising cable core in accordance with the invention.
Figure 2:
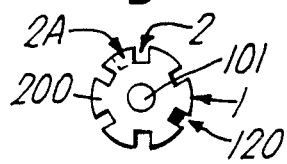
FIG. 2 is a cross-section through cable core which may be manufactured using the apparatus of FIG. 1.

With reference to FIGS. 1 and 2, a stranded steel strength member 101 is pulled from a drum 110 through an extruder head 102 which deposits around the strength member a core 200 of thermoplastics material such as polypropylene, the extruder head 102 being equipped with tooling to produce a multi-grooved plastics section, for example as shown in FIG. 2. In FIG. 2, the core is formed with six such grooves 2 with square sides, for accommodating optical fibre ribbons 120, or individual fibres (not shown), one or more in each groove 2. As an alternative, the grooves could be wider, as shown at 2A in FIG. 2.

Figure 3A:
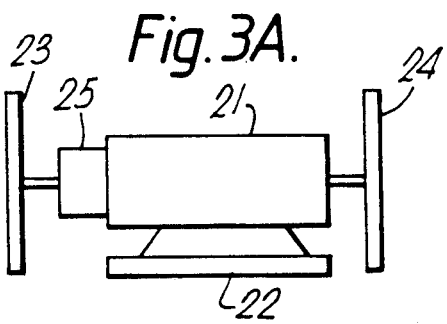
FIG. 3A is a side elevation of a motor drive assembly for imparting the necessary twisting motion to a portion of the extrusion die of FIG. 1.
Figure 3B:
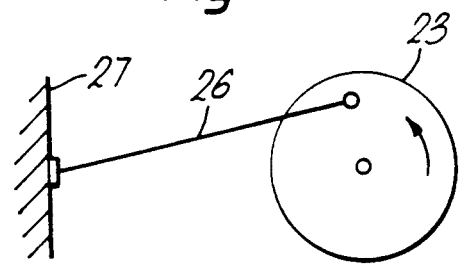
FIGS. 3B and 3C are respective end elevations of the motor drive assembly of FIG. 3A.
Figure 3C:
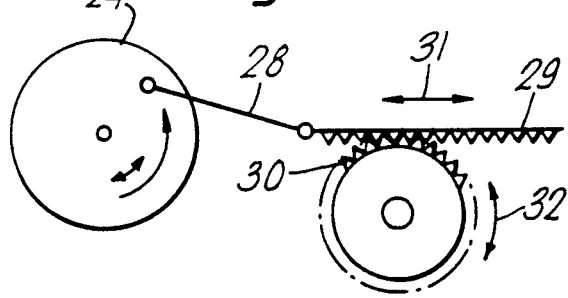

As the core 200 is extruded, the grooves 2 are made to twist relative to the central strength member 101, in a manner to be described below with reference to FIGS. 3 and 4.

The core assembly, comprising the plastics core section 200 with the embedded strength member 101, is then passed through a cooling trough 105 of a length sufficient to harden the thermoplastics material, and is subsequently passed through a dryer 106 to remove water.

The core assembly 101, 200 then passes to a capstan 107 which is arranged to draw the assembly from the extruder head 102, and whose speed is linked to that of the extruder scroll, both being controlled by a control unit 108 in response to signals from a diameter sensing device 109.

Figure 4:
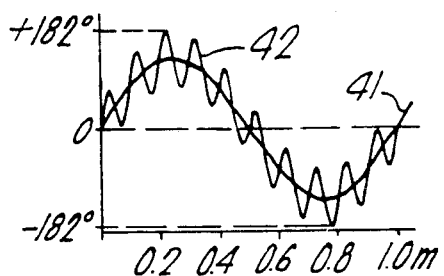
FIG. 4 is a graph illustrating the variation of the twist angle of one of the grooves of the cable core manufactured using the apparatus of FIG. 1, as a function of axial position along the cable core.

The grooves 2 are formed in parallel, each being twisted in the manner illustrated in FIG. 4. FIG. 4 is a graph of the twist angle of the groove, i.e. the angle of rotation about the core axis. This variation is represented by the continuous line 42, which can also be viewed as a representation of the groove as it would appear if the surface of the core were opened out flat. Thus a twist angle of 135° is equivalent in terms of peripheral distance around the core to $(135/360)\pi D$, where D is the core diameter.

The twisting pattern 42 is equivalent to a periodically reversing helix 41 of long pitch (i.e. 1000 mm) and large amplitude (a peak-to-peak variation of about 300°), superimposed on which is a substantially sinusoidal variation of short pitch (about 200 mm) and small amplitude (with a peak-to-peak variation of approximately 90°). An alternative example would be one with a long pitch (1000 mm), large amplitude peak-to-peak variation of 135° superimposed on which is a short pitch (100 mm) small amplitude peak-to-peak variation of about 40°.

The preferred pattern is produced by making corresponding rotary movements of a toothed element of the extrusion die 102. The toothed element, whose shape is generally complementary to that of the cross-section of the cable core 200, is driven by a motor drive assembly shown in FIG. 3, such that its angular position varies in accordance with the curve 42 of FIG. 4. In approximate terms, ignoring effects due to inertia and friction, the sequence of angular movements imparted to the toothed element would be, in one example; −65°, +132°, −65°, +132°, etc. Thus the toothed element would undergo a net rotation of +67° for each cycle of this short-pitch variation, and these net rotations would accumulate to constitute the long-pitch variation. This sequence would be reversed at each half cycle of the long-pitch variation, i.e. after every 500 mm in axial position, and the next sequence would be; −132°, +65°, −132°, +65°, etc.

This motion could be imparted to the toothed element of the die 102 by means of an electrically-controlled stepper motor, for example, but a particularly simple mechanical method will now be described with reference to FIG. 3. An electric drive motor 21 is supported for periodic sliding movement about its axis on a base 22. The rotor of the motor 21 is coupled to a fly-wheel 24 to which the rack 29 of a rack and pinion arrangement 29, 30 is coupled eccentrically by means of a pivoting arm 28. The resulting reciprocating motion 31 of the rack 29 is converted to angular variations 32 of the pinion 30, which is coupled rotationally to the toothed element of the die 102.

The rotor of the motor 21 is also coupled, by way of reduction gearing 25, to a further fly-wheel 23 which is coupled eccentrically to a fixed bracket 27 by way of a pivoting arm 26. The reaction from the reduction gearing 25 originating from the fixed bracket 27 causes the stator of the motor 21 to reciprocate angularly about its axis, sliding on the base 22. This superimposes an angular reciprocating motion of a relatively long period onto the relatively rapid rotational movement of fly-wheel 24. Clearly, with an appropriate choice of reduction gearing 25, the motion of the pinion 30 can be made to correspond to the variation 42 of FIG. 4.

In typical examples, the diameter D of the core 200 is 9 mm, and the slots are 1.5 mm deep and 2 mm wide. The relatively long pitch, although illustrated here as being 1000 mm, could for example be 800 or 900 mm, or even as much as 1200 mm or more. The short pitch twist angle, in this example 90°, could be as little as 35° or 40°. The amplitude of the long pitch twist, in this example 150°, could of course vary over a wide range.

The structure of optical cable described in this example is particularly compact, the outer diameter of the sheath being as little as 13 mm or even 12.5 mm.

Although in this example the twist variations are regular and periodic, it will be appreciated that the invention could still be performed using irregular variations, provided that they comprised relatively short-pitch, small amplitude variations superimposed on a relatively long-pitch variation.

The apparatus for feeding optical fibres in the form of ribbons into the grooved core will now be described with reference to FIGS. 5 and 6. Core 1 from the line shown in FIG. 1 is wound onto a reel for storage, which is subsequently loaded at 3 onto the assembly line of FIG. 5A; alternatively, the core 1 passes continuously into the line of FIG. 5A (downstream of reel 3).

The cable core 1 is paid off the stationary supply reel 3 and is fed along a straight feed path, which may be horizontal or vertical, to a take-up reel 17. The core 1 is tensioned between two twin-wheel tension units 4 and 14 between which 24 optical fibre ribbons are fed into the core, 4 in each groove 2. The cable is tensioned so as to elongate the core by a predetermined amount sufficient to provide an overfeed of optical fibre ribbon in each groove once the core is allowed to relax further downstream. Between the second tension unit 14 and the take-up reel 17, the core 1 passes through a grease applicator 15, at which the grooves are filled with grease, and then a lapping head 16 at which one or more tapes are applied longitudinally or helically around the core and ribbons.

Downstream of the first tension unit 4, the core 1 is fed axially through an upstream fibre guide 5, a downstream fibre guide 51 and then a whipping head 9. The upstream fibre guide 5 guides six groups each of four parallel optical fibre ribbons from supply bobbins 12 to corresponding apertures 10 in the downstream fibre guide 51, shown in greater detail in FIG. 5B. The rotational position of the upstream fibre guide 5 is controlled by an electric motor 13 in accordance with a servo mechanism 131, which responds to the relative angles of the upstream and downstream guides, which have shaft encoders.

The downstream fibre guide 51 is free to rotate about the core feed path independently of the upstream fibre guide 5. As shown in FIG. 5B, the downstream fibre guide 51 consists of a cylindrical body 7 supported by roller bearings 511 for free rotation about the feed path, limited only by a friction brake 522 (FIG. 5A) which exerts a predetermined constant braking torque. The cylindrical body 7 is closed at its upstream end by a guide plate 6 in which the apertures 10, referred to above, are spaced equi-angularly at a common radius, as shown more clearly in FIG. 6. The guide plate 6 has a central circular aperture on the core feed path, into which project six follower teeth 11 adjacent respective apertures 10. The teeth 11 are complementary in shape to the grooves 2, and in use follow the grooves to maintain the plate 6 and consequently the whole of the downstream fibre guide 51 in correct register with the grooves on the core 200.

The cylindrical body 7 is fitted with a close-fitting die 8 which defines an annular guiding surface 81 concentric with, and at a slightly greater radius than, the core surface. A resiliently deformable 0-ring 82 projects from an annular retaining groove in the surface 81. The die 8, cylindrical body 7 and end guide plate 6 together define a frusto-conical chamber within which the six groups of four optical fibre ribbons 120 are guided as stacks into their respective grooves 2.

In use, the die 8 causes a respective stack of four ribbons 120 to slide into the base of its respective groove. The die has a resiliently expandable bore, by virtue of the 0-ring 82. The fact that the downstream fibre guide 51 follows precisely the positions of the grooves ensures that the ribbons 120 are guided into the grooves at the correct angle, which will in general be a small acute angle to an imaginary longitudinal line on the core surface when viewed normally to that surface. This is to allow for the fact that the grooves are helical and not straight. The surface 81 of the die 8 is as close as possible to the guide plate 6 without making the angle a between the ribbon 120 and the core feed path so great as to interfere with the smooth sliding of the ribbon into the groove. Over this small axial distance, the angular position of each groove will have changed very slightly, as described below.

The upstream fibre guide will now be described with reference to FIGS. 5A, 5C, 5D and 5E. It comprises a dumb-bell shaped bobbin 501 driven by the electric motor 13 under the control of the servo mechanism described above. For each ribbon 120, a plastics guide tube 502 is secured generally longitudinally between the peripheral edges of the two end discs of the dumb-bell shaped bobbin 501. The guide tubes 502 are distributed around the periphery in six groups of four adjacent ones, the groups being spaced equally by 60° to correspond with the positions of the grooves 2 and the apertures 10. The guide tubes 502 are co-extensive with the bobbin 501, and have a circular cross-section (FIG. 5E) at the upstream end changing smoothly to an oval, almost rectangular, cross-section (FIG. 5D) at the downstream end. This is achieved by pushing the downstream ends into longitudinal grooves in the surface of the downstream disc of the bobbin 501, the tubes 502 being naturally cylindrical.

The downstream ends of the guide tubes 502 may be inclined at a small acute angle to the axis, to assist in the passage of the ribbons into the grooves.

An independently rotatable cylinder 503 is located directly upstream of the bobbin 501, and has a highly polished, low friction surface. The cylinder may be freely rotatable, but is preferably driven by independent drive means in such a direction as to assist the motion of the ribbons.

Twenty-four ribbon supply bobbins 12 are arranged in a floating carriage 121 around the cylinder 503 and coaxial with it, with the axes of bobbins 12 parallel to that of the cylinder 503. The optical fibre ribbons 120 are fed from the respective bobbins 12 around respective guide rollers 504 and then around the common cylinder 503, and then through respective guide tubes 502, at each stage the angle of the ribbon axis relative to the cable core axis getting smaller, and the angle of orientation of the plane of each ribbon turning from being normal to the radius of the core to being parallel with the radius, i.e. "vertically" disposed with respect to the slots 2 as shown in FIG. 2. This turning of the ribbons is achieved firstly by the curvature of the guide tube axes, and secondly by the flattened cross-section of the guide tubes which prevents the ribbons turning. The respective ribbons are maintained in station and are prevented from tangling; variations in longitudinal movement are also accommodated, and a slight tension may be applied.

The orientation of the ribbons as they emerge from the upstream guide is thus radial relative to the core, i.e. the ribbon planes are normal to the core surface. It is at this orientation that the ribbons 120 rest in the grooves 2, side by side in a stack of four.

The axial distance, which should be less than a quarter of the pitch of the long pitch variations in groove position, between the plate 6 and the point of entry of each fibre ribbon into the groove, allows the fibre ribbon to enter at the correct angle. Firstly, there is a delayed reaction inherent in the servo mechanism controlling the angular position of the upstream guide 5, so that there is an angular difference between the positions of the relevant aperture 10 in the plate 6 and the point 502 at which the fibre ribbon leaves the upstream guide 5. This angular difference will oscillate between positive and negative values, as a function of the longer pitch variations in groove position. Secondly, there is a corresponding angular positional difference between the aperture 10 in the plate 6 through which the fibre ribbon is fed and the point it enters the groove. These two angular differences are arranged to correspond such that there is always an alignment between the point of entry into the groove, the aperture 10, and the point of exit from the upstream guide, i.e. the downstream end of the guide tube 502. The alignment is regulated also by the inherent stiffness of the fibre ribbon.

The function of the brake 522 is to cause the core 1 to twist about its axis, so that the grooves are partially straightened in the region at which the fibre ribbons are fed into them. This reduces the angular movement required of the upstream and downstream fibre guides 5, 51, and correspondingly reduces the dynamic forces involved. The braking force is adjusted so that the short pitch angular variations of the grooves do not overcome the brake and do not cause the fibre guides to move, so that the grooves are partially untwisted. Only the longer pitch, "S-Z" variations cause the plate 6 to apply sufficient torque to overcome the brake and to allow the fibre guides to follow the grooves.

It occasionally happens that the core on the supply reel 3 is over-twisted. Typically, the amplitude of the long-pitch variations in groove angular position is $\pm 360°$, and periodically there may be an extra half-turn or full-turn. This is accommodated by a partial rotation of the ribbon supply bobbin carriage 121 about the core feedpath, controlled by a servo mechanism responsive to angular movements of the plate 6 in excess of a predetermined threshold, such as $\pm 360°$ relative to the carriage. A lug 18 on the plate 6 (see FIG. 2) activates either of two microswitches 19 in these circumstances, and this energises a motor 122 in the appropriate rotational sense.

Excessive twisting of the core could alternatively, or in addition, be accommodated by rotating the supply reel 3 and tensioning units 4,14; such rotation, together with a rotation of the take-up reel 17, could even be made continuous in order to feed helical (not reversing helical) grooved core with ribbons.

This invention is particularly useful with high fibre density cables, in which a "ribbon pack" occupies a high proportion of the groove area, and where it could be very difficult to feed the ribbons using guide tubes of the type disclosed in GB-2022644, for example. The invention exploits the inherent stiffness of the optical fibre ribbon, in that the end of the ribbon, downstream of the aperture in the downstream guide, need not be guided positively by a tube or any member projecting into the groove.

Although in these examples the groove configuration is of the reversing helical type with superimposed short-pitch and long-pitch variations of twist angle, the apparatus could be used with conventional reversing helical grooves, continuous helical grooves, or even straight grooves. Where the grooves are of the continuous helical type, as described above, the whole apparatus illustrated in FIG. 5 would have to be rotatable.

In the optical cable core assembly produced by the apparatus of FIG. 5, the ribbons are contained vertically in the grooves, i.e. edge on, with their planes radial to the cylindrical core and normal to the core surface. The ribbons undulate across the groove between the groove walls, and this allows a substantial degree of ribbon overfeed to be accommodated, to provide axial tensile strain relief. Clearly there must be gaps between the ribbons and the side walls of the groove, but the grooves should not be so wide as to allow the ribbons to re-orientate parallel to the core surface—they should be maintained substantially "edge on". The ribbon edge may engage the base of the groove, but this is not essential.

We claim:

1. Apparatus for laying an optical fibre unit into one of a plurality of parallel helical or reversing helical grooves in the outer surface of a cable core, comprising: means for conveying the core along a path; a downstream guide freely rotatable about the core path and having an aperture for feeding the fibre unit into the groove and an inward projection for following one of the grooves to maintain registration of the downstream guide with the groove; an upstream guide independently rotatable about the core path and adjacent, upstream of, and having an angular position relative to, the downstream guide, said upstream guide having means for guiding the fibre unit from a fibre unit supply toward the downstream guide; servo drive means responsive to rotation of the downstream guide relative to the upstream guide to adjust the angular position of the upstream guide in relation to the downstream guide and the groove; and a brake which exerts a predetermined braking torque on the downstream guide for limiting the free rotation thereof.

2. Apparatus for laying an optical fibre unit into one of a plurality of parallel helical or reversing helical grooves in the outer surface of a cable core, comprising: means for conveying the core along a path; a downstream guide freely rotatable about the core path and having an aperture for passage of the fibre unit therethrough and an entry point for the fibre unit into the groove, said downstream guide also having an inward projection for following one of the grooves to maintain registration of the downstream guide with the groove; a fibre unit supply means; an upstream guide adjacent, upstream of, and having an angular position relative to, the downstream guide for receiving the fibre unit from the supply means, and having exit means for feeding the fibre unit toward said aperture in the downstream guide; and servo drive means responsive to rotation of the downstream guide relative to the upstream guide to adjust the angular position of the upstream guide with respect to the downstream guide to maintain an alignment between the exit means of the upstream guide, the aperture in the downstream guide and the entry point of the fibre unit into the groove.

3. Apparatus according to claim 2, in which the downstream guide has, for each groove of the core, a correspondingly-positioned aperture for feeding a respective optical fibre unit into the groove.

4. Apparatus according to claim 3, in which the downstream guide has an inward projection in registration with each aperture for following a corresponding groove.

5. Apparatus according to claim 2, in which the downstream guide comprises a plate in which each aperture is formed, and an annular guide surface downstream of the plate and positioned about the core path at a radius slightly greater than that of the core surface to slide each fibre unit into its corresponding groove.

6. Apparatus according to claim 2, in which the optical fibre unit includes a stack of optical fibre ribbons, and in which the upstream guide includes a guide tube for the passage of the optical fibre ribbon stack, and has a cross-section at its downstream end which is shaped to control the orientation of the stack in relation to the groove.

7. Apparatus according to claim 2, in which a pair of tension units are engageable with the core and located respectively upstream and downstream of the guides, said tension units being operative to produce a temporary elongation of the core over a region in which the fibre unit is introduced into the groove.

* * * * *